July 18, 1933. A. PENN 1,918,612
SAFETY DEVICE FOR TIRE INFLATERS
Filed Jan. 19, 1931
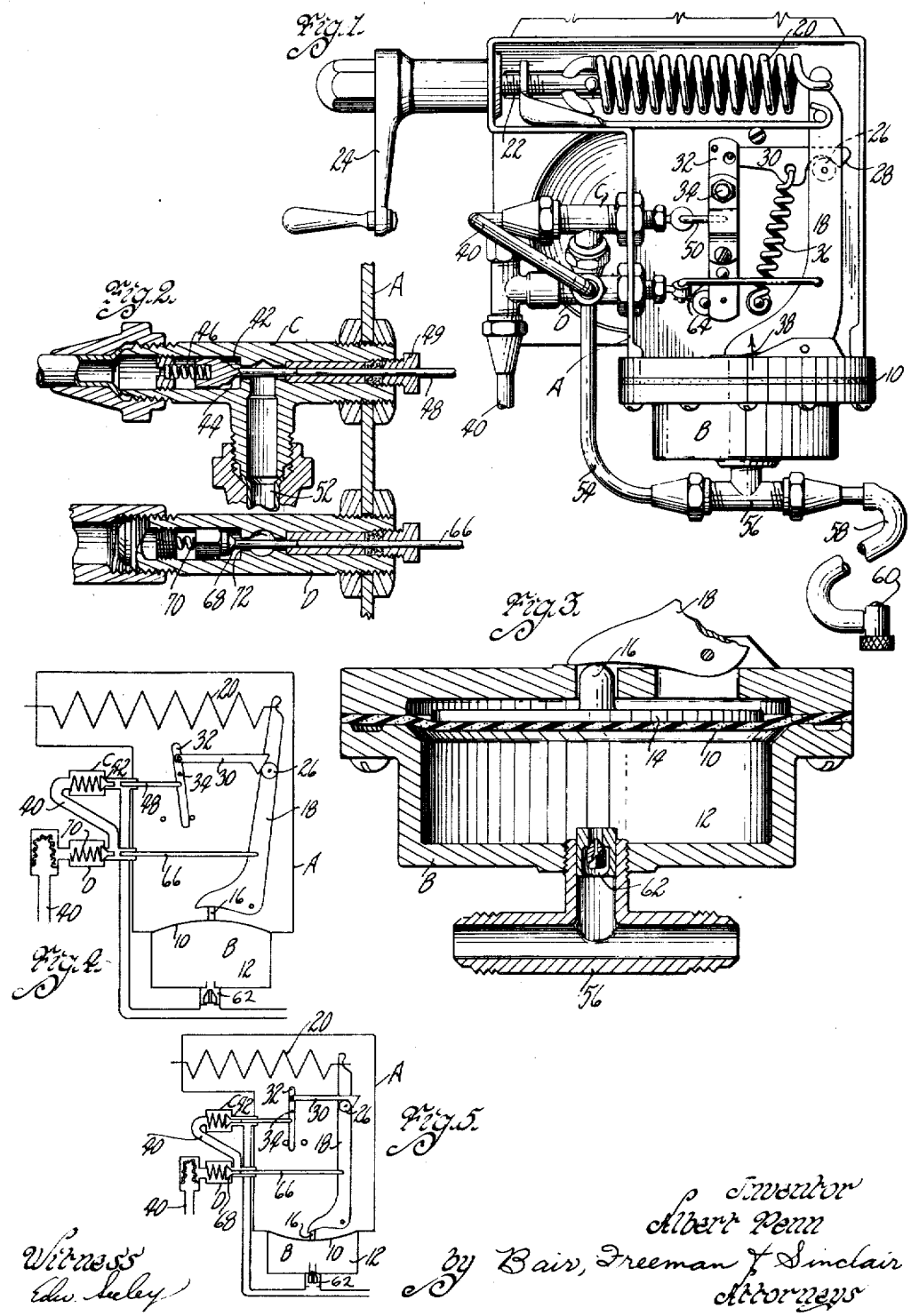

Patented July 18, 1933

1,918,612

UNITED STATES PATENT OFFICE

ALBERT PENN, OF DES MOINES, IOWA, ASSIGNOR TO PENN ELECTRIC SWITCH CO., OF DES MOINES, IOWA, A CORPORATION OF IOWA

SAFETY DEVICE FOR TIRE INFLATERS

Application filed January 19, 1931. Serial No. 509,618.

The object of my invention is to provide a safety device for use in connection with a tire inflating apparatus of the kind disclosed in my prior Patent, No. 1,618,953, issued February 22, 1927.

My prior patent here referred to has to do with a device whereby a tire may be inflated to a predetermined pressure by a plurality of successive charges of air, these charges being delivered from a source of compressed air supply to the tire upon operation of the inflater mechanism. The inflater mechanism includes a valve member adapted to be moved to open position with each operation of the inflater and when in such open position air from the source of supply will pass through the mechanism to the tire. In order to have successive charges the valve moves by spring pressure to closed position after each charge. The valve is opened as result of changes of air pressure against a movable diaphragm coacting with a lever to actuate an actuating member for moving the valve to open position.

There is the possible danger that the valve member that controls the supply of air will be held open by improper adjustment of the packing gland. There is also the possibility that the valve member will be held open by some foreign substance entering the air supply line and preventing or effecting the closing movement of the valve closure member. In any such contingency the air from the source of supply will pass as "straight air" into the tire. The obvious danger is blowing up the tire and causing both personal and property damage.

The automatic inflater is adapted to be set for the desired amount of pressure and normally it operates to permit air to pass into the tire to be inflated in successive charges and when the predetermined amount of pressure is reached, the device ceases operation and the valve then remains in closed position, and it is only when the valve for some unforeseen reason sticks in open position that it is desirable to provide a safety device for preventing "straight air" from passing into the tire.

The valve member that controls the passage of air by successive charges is positively opened by a "snap action" and then closed by a spring member within the valve itself.

With these and other objects in view, my invention consists in the construction, arrangement and combination of the various parts of my device, whereby the objects contemplated are attained, as hereinafter more fully set forth, pointed out in my claims and illustrated in the accompanying drawing. Although the invention is susceptible of a variety of embodiments, it is unnecessary to fully describe and illustrate more than one in order to give a full understanding of the invention both from its structural and functional standpoints. Accordingly, I have illustrated a preferred and desirable embodiment of the invention in the accompanying drawing, in which:

Figure 1 is a plan view of my automatic tire inflater with the safety device installed thereon.

Figure 2 is an enlarged sectional view through the valve members.

Figure 3 is a sectional view through the diaphragm structure and the choker element leading to the diaphragm chamber.

Figure 4 is a diagrammatic view illustrating the safety valve and control valve in closed position; and Figure 5 is a similar diagrammatic view illustrating the parts in position where the safety valve and control valve are in open position.

In the accompanying drawing, I have used the reference charatcer A to indicate generally a casing or shell within which the operating parts of my inflater mechanism are positioned.

A diaphragm assembly B includes a diaphragm 10, a chamber 12 and a diaphragm plate 14 having an operating pin 16 thereon. The diaphragm assembly B is secured to one end of the casing A. An operating lever 18 is pivotally mounted and has one end in engagement with the pin 16 and its other end secured to a coil spring 20. The spring 20 in turn has its free end secured to a threaded member 22 whereby adjustment may be had by rotating the operating handle 24. The lever 18 includes a roller 26 adapted to engage the V-point 28 of an arm 30. The arm 30 is pivotally connected to an actuated member 32, which in turn is pivotally mounted as at 34 upon the casing A.

A coil spring 36 anchored to the casing A at one end has its other end connected to the arm 30, thereby maintaining engagement between the V-shaped cam member 28 and the roller 26.

Movement of the lever in the direction indicated by the arrow 38 as result of increased pressure within the diaphragm chamber 12 will cause the roller 26 to ride up over one side of the V-shaped cam member 28 against the action of the spring 20. After the roller passes over the point of the V-shaped cam member 28, due to the lever 18 having been moved, there will be a sudden or snap movement of the arm 30, which in turn will cause the actuated member 32 to swing upon its pivot 34.

The parts just described are all substantially the same as those shown in my Letters Patent, No. 1,618,953.

A valve member C is mounted on the casing A and is connected to a source of air supply by means of a conduit 40. The valve member C includes a seat 42 and a closure element 44. The closure element 44 is spring-pressed by means of a spring 46 and is therefore under pressure to move to closed position.

A pin 48 is mounted within the valve member C and is connected to a link 50 which in turn is connected to the actuated member 32. A packing gland 49 forms a part of the valve member C and the pin 48 extends therethrough. Too tight an adjustment of the packing gland 49 will increase the frictional load applied from the packing gland to the pin 48, thus increasing the load on the spring 36 sufficiently to prevent moving the actuated member 32, thereby maintaining the valve C in open position. Normal movement in one direction of the member 32 upon its pivot 34 will impart movement to the pin 48, thus raising the closure element 44 off of its seat 42 and opening the valve C, this being accomplished by a "snap action".

When the actuated member 32 returns or swings to its other position, then the pin 48 is withdrawn partially from the valve C and the spring 46 will thus cause the closure element 44 to move against the seat 42. Air from the conduit 40 passes through the valve member C when open and is discharged through the passage 52. The passage 52 is connected by a conduit 54 to a T-shaped fitting 56 having one end in communication with a hose 58. The hose 58 has a conventional tire chuck 60 thereon.

It will be noted that when the valve member C is in open position, air from the conduit 40 may pass therethrough through the pipe 50, T-fitting 56 into the hose 58.

When the tire chuck 60 is placed upon a valve stem of a tire, it will be in open position and permit air to pass into the tire.

In order to fill the tire by successive charges, I provide a pulsation plug 62 within the T-fitting just ahead of the diaphragm chamber 12. The pulsation plug is provided with a very small orifice through which air from the supply line or fitting 56 is permitted to pass into the diaphragm chamber. Air passes into the diaphragm chamber very slowly, although the pulsation plug is such that air from the diaphragm chamber will pass out rapidly. The delayed action occurs in filling the diaphragm chamber.

The operation of the device so far as automatic tire inflation is concerned is opening the chuck 60 by placing it over a valve stem of a tire. Air within the hose 58 and diaphragm chamber 12 will quickly drop in pressure thus causing the lever 18 to assume the position shown in Figures 1 and 5 at which time the valve C will be in open position.

Air will then flow from the source of supply to the tire due to the fact that air from the source of supply passing through the air service line will be permitted to enter the diaphragm chamber slowly and in the meantime the tire is being partially filled.

When air from the supply line reaches the diaphragm chamber in such an amount necessary to cause operation, then the lever 18 will be swung to the position shown in the diagrammatic Figure 4, at which time the valve C will be permitted to close. This cycle of operation continues until the tire has been filled with the amount of pressure for which the device has initially been set, and at such time the parts assume the position shown in Figure 4 and the valve C is closed.

The real danger is in the possibility of the valve C or the closure element 44 thereof sticking in open position. If it sticks in open position, there will be a steady supply of "straight air" passing from the source of supply to the tire and to the diaphragm chamber, while the mechanism parts assume necessary position for automatic operation, yet the valve stays open. The operator expecting the automatic device to operate the valve will find that his tire may be subjected to an excessive pressure which may result in blowing up the tire and personal injury.

In order to safeguard against such possible contingency and reducing the possibility of getting "straight air" to a very minimum, I provide a second valve member D, which is placed within the conduit 40 so that it is just ahead of the valve C.

The valve member D is substantially a duplicate of the valve member C and it is operated by means of a link 64 connected to the lever 18.

The link 64 engages a pin 66, which is used for engaging the closure element 68 against the action of the spring 70.

The closure element 68 of the valve D is adapted to fit itself on the seat 72. As the lever 18 moves in a direction opposite to the arrow 38 for tripping the actuating arm 32 to open the valve C, it likewise forces the link 64 in a direction to have the pin 66 of the valve D engage the closure element 68 to open the valve D. Opening of the valve D is exactly in timed relation to the movement of the lever 18 in the direction towards the valve and is not snap acting.

The valves D and C are each operated at substantially the same time with a slight preference for the valve D to open first and close last.

Should the closure element 44 of the valve C remain in open position for any cause, then the valve D will act as a safety device and will go to closed position as result of its spring 70, when the diaphragm pressure has reached a sufficient amount to move the lever 18 and the link 64 away from the valve closure 68 to permit it to go closed.

It will be noted that the valves C and D open as result of common mechanism, that being the lever 18 and the actuating parts associated therewith. Each valve C and D, however, is closed or moved to closed position by independent springs 46 and 70.

The valve D is operated directly from the lever 18. This connection insures a sufficient amount of power for pulling the pin 66 away from the valve closure 68 irrespective of the tightening of the packing gland 67 upon the valve member D.

It will be noted that so far as the valve member D is concerned, there is a direct connection between it and the lever and the lever is positively operated by the diaphragm in a direction to move the pin 66 away from the closure element 68.

The valve D is simply placed ahead of the valve C in the conduit or air service line leading from the source of supply to the valve C. Should the valve C remain in open position, then the valve D will move to closed position when the lever 18 is in position to permit it to go to closed position.

Should the valve C fail to move to closed position for any reason whatsoever, then "straight air" will pass through to the tire and in such condition the safety valve or valve D will operate. The operation of the valve D is as follows:—"Straight air" will pass to the tire from the source of supply as result of the valve C failing to operate. Pressure will be built up within the diaphragm chamber against the diaphragm. When this pressure reaches the amount equal to the resistance of the spring 20 upon the lever 18 as well as the additional amount required for operating the snap action parts associated with the lever, then the lever 18 will be moved away from the valve or to its high pressure position as result of increased pressure upon the diaphragm. If the device is set for sixty pounds and such tension is placed upon the spring 20, then upon failure of the valve C, the diaphragm chamber will be built up with air and when it reaches sixty pounds, plus whatever number of pounds that it takes to operate the snap action mechanism, will then cause the lever 18 to move to position for permitting the valve D to go closed. The amount of air passing into the tire as result of "straight air" will equal the amount for which the device is set plus the differential which is the necessary amount required for operation of the snap action mechanism.

By way of example, the inflater operates upon a differential of about fifteen pounds, and in such case this is the maximum amount of over-run of air pressure which can reach the tire when the valve C fails to function. My device serves as a safety against property and personal damage. The over-run, when my safety device functions, is not enough to in any way injure the ordinary automobile tire.

The safety valve D as here used is, of course, applicable to devices where air is delivered to a tire in successive charges and as shown in my Patent, No. 1,618,953.

The safety device is quite desirable and it eliminates the danger of having a tire excessively over-inflated in case the valve C remains open for any cause.

Some changes may be made in the construction and arrangement of the parts of my safety device for tire inflaters without departing from the real spirit and purpose of my invention, and it is my intention to cover by my claims, any modified forms of structure or use of mechanical equivalents, which may be reasonably included within their scope.

I claim as my invention:

1. The combination with an air service line having a valve controlled portion and means for discharging air in successive charges when said valve is opened comprising a control valve in the air service line, a lever, means for subjecting the lever to pressure in the air service line between said valve controlled portion and said control valve and to the pressure from the outlet side of said control valve and an independent mechanism actuated from the lever for actuating said control valve, of a safety valve in said air service line and a direct connection between said lever and said safety valve for positively actuating the same to closed position in case of said lever being subjected to excessive pressure.

2. In a tire inflating apparatus, an air service line adapted to discharge air into a tire, a control valve in said line, pressure responsive means subject to pressure from the outlet side of said control valve, a snap action device operable thereby for intermittently opening said control valve and a safety valve in said line between said control valve and the source of air supply and positively operable to closed position by said pressure responsive means in case of the presence of excessive pressure applied thereon.

3. In an air service device for filling a receiver to a predetermined amount of air pressure, an air service line, pressure responsive means, a control valve controlling said air service line, said pressure responsive means being subject to pressure from the outlet side of said control valve, snap action means operable by said pressure responsive means for successively opening said control valve for permitting charges of air to pass to said receiver and a safety controlling valve controlling the flow of air to said device and normally operable to open position by said pressure responsive means, said safety valve being positively closed by said pressure responsive means in case of the presence of excessive pressure applied thereon and said valves being operable independently of each other for closing movement.

4. In a device of the character described, an air service line adapted to discharge air into a receiver, pressure responsive means, a control valve in said line, mechanism operable by said pressure responsive means for intermittently opening said control valve with snap action and a safety valve also in said line operable to open position by said pressure responsive means, arranged in the inlet of said control valve, independent of said control valve and directly connected with said pressure responsive means.

5. In a tire inflating apparatus adapted to permit air to pass into a tire in successive charges, an air service line, a control valve in said line, pressure responsive means, means operable by said pressure responsive means for controlling said control valve with snap action and a safety valve in said air service line, in the inlet of said control valve but independent thereof and directly operable by said pressure responsive means, upon said control valve remaining open, to close said air service line when air pressure upon said pressure responsive means reaches an amount in excess of the pressure required for normal operation of the apparatus.

6. In a tire inflating apparatus adapted to permit air to pass into a tire in successive charges, an air service line, a control valve in said line, pressure responsive means, means operable by said pressure responsive means for controlling said control valve with snap action and a safety valve in said air service line, in the inlet of said control valve but independent thereof and directly operable by said pressure responsive means, upon said control valve remaining open, to close said air service line.

7. In a tire inflating apparatus, an air service line adapted to discharge air into a tire, a control valve in said line, pressure responsive means, a snap action device operable by said pressure responsive means for intermittently opening said control valve and a safety valve also in said line, in the inlet of said control valve but independent thereof and directly operable by said pressure responsive means when air pressure upon said pressure responsive means reaches an amount in excess of the pressure required for normal operation of the apparatus.

8. In a tire inflating apparatus adapted to permit air to pass into a tire in successive charges, an air service line, a control valve in said line, pressure responsive means, means operable by said pressure responsive means for controlling said control valve with snap action and a safety valve in said air service line, in the inlet of said control valve but independent thereof and directly operable by said pressure responsive means, upon said control valve remaining open, to close said air service line, said safety valve being automatically restored to normal position to serve as a safety valve when said control valve returns to closed position.

ALBERT PENN.

DISCLAIMER 1,918,612.—*Albert Penn*, Des Moines, Iowa. SAFETY DEVICE FOR TIRE INFLATERS. Patent dated July 18, 1933. Disclaimer filed August 25, 1934, by the assignee, *Penn Electric Switch Co.*

Hereby disclaims from the scope of each of claims 1 and 3 of the specification of said patent any device or apparatus such as defined in said claims 1 and 3 of said patent other than those having a safety valve which is permitted to move to closed position and which is not positively actuated or moved to closed position.
[*Official Gazette September 18, 1934.*]

ice line adapted to discharge air into a tire, a control valve in said line, pressure responsive means subject to pressure from the outlet side of said control valve, a snap action device operable thereby for intermittently opening said control valve and a safety valve in said line between said control valve and the source of air supply and positively operable to closed position by said pressure responsive means in case of the presence of excessive pressure applied thereon.

3. In an air service device for filling a receiver to a predetermined amount of air pressure, an air service line, pressure responsive means, a control valve controlling said air service line, said pressure responsive means being subject to pressure from the outlet side of said control valve, snap action means operable by said pressure responsive means for successively opening said control valve for permitting charges of air to pass to said receiver and a safety controlling valve controlling the flow of air to said device and normally operable to open position by said pressure responsive means, said safety valve being positively closed by said pressure responsive means in case of the presence of excessive pressure applied thereon and said valves being operable independently of each other for closing movement.

4. In a device of the character described, an air service line adapted to discharge air into a receiver, pressure responsive means, a control valve in said line, mechanism operable by said pressure responsive means for intermittently opening said control valve with snap action and a safety valve also in said line operable to open position by said pressure responsive means, arranged in the inlet of said control valve, independent of said control valve and directly connected with said pressure responsive means.

5. In a tire inflating apparatus adapted to permit air to pass into a tire in successive charges, an air service line, a control valve in said line, pressure responsive means, means operable by said pressure responsive means for controlling said control valve with snap action and a safety valve in said air service line, in the inlet of said control valve but independent thereof and directly operable by said pressure responsive means, upon said control valve remaining open, to close said air service line when air pressure upon said pressure responsive means reaches an amount in excess of the pressure required for normal operation of the apparatus.

6. In a tire inflating apparatus adapted to permit air to pass into a tire in successive charges, an air service line, a control valve in said line, pressure responsive means, means operable by said pressure responsive means for controlling said control valve with snap action and a safety valve in said air service line, in the inlet of said control valve but independent thereof and directly operable by said pressure responsive means, upon said control valve remaining open, to close said air service line.

7. In a tire inflating apparatus, an air service line adapted to discharge air into a tire, a control valve in said line, pressure responsive means, a snap action device operable by said pressure responsive means for intermittently opening said control valve and a safety valve also in said line, in the inlet of said control valve but independent thereof and directly operable by said pressure responsive means when air pressure upon said pressure responsive means reaches an amount in excess of the pressure required for normal operation of the apparatus.

8. In a tire inflating apparatus adapted to permit air to pass into a tire in successive charges, an air service line, a control valve in said line, pressure responsive means, means operable by said pressure responsive means for controlling said control valve with snap action and a safety valve in said air service line, in the inlet of said control valve but independent thereof and directly operable by said pressure responsive means, upon said control valve remaining open, to close said air service line, said safety valve being automatically restored to normal position to serve as a safety valve when said control valve returns to closed position.

ALBERT PENN.

DISCLAIMER 1,918,612.—*Albert Penn*, Des Moines, Iowa. SAFETY DEVICE FOR TIRE INFLATERS. Patent dated July 18, 1933. Disclaimer filed August 25, 1934, by the assignee, *Penn Electric Switch Co.*

Hereby disclaims from the scope of each of claims 1 and 3 of the specification of said patent any device or apparatus such as defined in said claims 1 and 3 of said patent other than those having a safety valve which is permitted to move to closed position and which is not positively actuated or moved to closed position.

[*Official Gazette September 18, 1934.*]